United States Patent
Duong et al.

(10) Patent No.: US 11,346,427 B2
(45) Date of Patent: May 31, 2022

(54) ACCESSORY GEARBOX FOR GAS TURBINE ENGINE WITH VARIABLE TRANSMISSION

(71) Applicant: United Technologies Corporation, Farmington, CT (US)

(72) Inventors: Hung Duong, Unionville, CT (US); Marc J. Muldoon, Marlborough, CT (US); Gabriel L. Suciu, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 447 days.

(21) Appl. No.: 16/274,332

(22) Filed: Feb. 13, 2019

(65) Prior Publication Data

US 2020/0256431 A1 Aug. 13, 2020

(51) Int. Cl.
| | | |
|---|---|---|
| *F16H 3/00* | (2006.01) |
| *F02C 7/32* | (2006.01) |
| *F02K 3/06* | (2006.01) |
| *F16H 3/02* | (2006.01) |

(52) U.S. Cl.
CPC .............. *F16H 3/001* (2013.01); *F02C 7/32* (2013.01); *F02K 3/06* (2013.01); *F16H 3/006* (2013.01); *F16H 3/02* (2013.01); *F05D 2260/4031* (2013.01)

(58) Field of Classification Search
CPC . F16H 3/001; F16H 3/006; F16H 3/02; F02C 7/32; F02C 7/36; F02K 3/06; F05D 2260/4031; F05D 2250/311; F05D 2250/36
See application file for complete search history.

(56) References Cited

U.S. PATENT DOCUMENTS

| | | | | |
|---|---|---|---|---|
| 4,776,163 | A | * | 10/1988 | Brockmann ............. F02C 7/32 60/792 |
| 6,672,049 | B2 | * | 1/2004 | Franchet ................. F02C 7/262 60/226.1 |
| 7,942,079 | B2 | | 5/2011 | Russ |

(Continued)

FOREIGN PATENT DOCUMENTS

| | | |
|---|---|---|
| EP | 2696057 A1 | 2/2014 |
| EP | 3032074 A1 | 6/2016 |

(Continued)

OTHER PUBLICATIONS

European Search Report for EP Application No. 20157022.3 dated Jul. 10, 2020.

*Primary Examiner* — Victor L MacArthur
(74) *Attorney, Agent, or Firm* — Carlson, Gaskey & Olds, P.C.

(57) ABSTRACT

An auxiliary gearbox has a low speed input shaft driving a first plurality of accessories. A high speed input shaft drives a second plurality of accessories. The first plurality of accessories rotating about a first set of rotational axes, which are parallel to each other and perpendicular to a first plane. The second plurality of accessories rotating about a second set of rotational axes, which are parallel to each other and perpendicular to a second plane. The first and second planes extending in opposed directions away from a drive input axis of the high speed input shaft and the low speed input shaft. The low speed input shaft drives a variable speed transmission. A gas turbine engine is also disclosed.

18 Claims, 3 Drawing Sheets

(56) References Cited

U.S. PATENT DOCUMENTS

| | | |
|---|---|---|
| 8,074,455 B2 | 12/2011 | Pierrot et al. |
| 8,966,911 B2 | 3/2015 | Ress, Jr. et al. |
| 8,973,465 B2 * | 3/2015 | Duong ................... F16H 1/222 74/665 F |
| 9,863,325 B2 | 1/2018 | Lemarchand |
| 10,954,862 B2 * | 3/2021 | Guillemont ............. F16H 1/222 |
| 2005/0183540 A1 | 8/2005 | Miller |
| 2008/0072568 A1 * | 3/2008 | Moniz ................... F01D 25/34 60/226.1 |
| 2008/0148881 A1 * | 6/2008 | Moniz ...................... F02C 7/32 74/15.6 |
| 2009/0064683 A1 * | 3/2009 | Moniz ...................... F02C 7/36 60/792 |
| 2009/0205341 A1 | 8/2009 | Muldoon |
| 2013/0047626 A1 * | 2/2013 | Merry ...................... F02C 7/32 60/778 |
| 2013/0247539 A1 | 9/2013 | Hoppe |
| 2016/0169118 A1 * | 6/2016 | Duong ...................... F02C 7/32 74/664 |
| 2017/0082028 A1 | 3/2017 | Duong et al. |
| 2017/0298831 A1 * | 10/2017 | Guillemont ............... F02C 7/32 |
| 2018/0149091 A1 | 5/2018 | Howell et al. |
| 2018/0171815 A1 * | 6/2018 | Suciu ...................... F01D 15/12 |
| 2018/0202368 A1 * | 7/2018 | Suciu ...................... F02C 7/185 |
| 2018/0223739 A1 | 8/2018 | Dubreuil et al. |

FOREIGN PATENT DOCUMENTS

| | | | |
|---|---|---|---|
| EP | 3336334 A1 | 6/2018 | |
| FR | 2921423 A1 * | 3/2009 | ................ F02C 7/36 |

* cited by examiner

ACCESSORY GEARBOX FOR GAS TURBINE ENGINE WITH VARIABLE TRANSMISSION

BACKGROUND

This application relates to an accessory gearbox for a gas turbine engine, wherein a variable transmission is included.

Gas turbine engines are known and typically include a fan delivering air into a bypass duct as propulsion air and into a compressor section. Air is compressed in the compressor section and delivered into a combustor where it is mixed with fuel and ignited. Products of this combustion pass downstream over turbine rotors driving them to rotate.

The turbine rotors drive a number of accessories associated with the gas turbine engine, or perhaps an associated aircraft through a tower shaft.

It is known for a gas turbine engine to have two spools, with a first rotating at lower speeds and lower pressures, and a second rotating at higher speeds and higher pressures. It has been proposed to drive accessories from tower shafts driven by each of the two spools.

As gas turbine engines become smaller, packaging for the gearboxes that transmit drive from the tower shafts to the various auxiliary systems becomes a challenge.

SUMMARY

In a featured embodiment, a gas turbine engine includes a low speed input shaft from a lower speed spool and a high speed input shaft from a higher speed spool. The low speed input shaft is connected to drive a first plurality of accessories, and the high speed input shaft connected to drive a second plurality of accessories. The first plurality of accessories rotate about a first set of rotational axes, which are parallel to each other but spaced along an axial input direction and are perpendicular to a first plane and the second plurality of accessories rotating about a second set of rotational axes, which are parallel to each other and spaced along an axial input direction and perpendicular to a second plane. The first and second planes extend in opposed directions away from a drive input axis of the high speed input shaft and the low speed input shaft. The low speed input shaft drives a transmission gear. The transmission gear is an input to a variable speed transmission. The variable speed transmission varies an input speed to a desired output speed, and the variable speed transmission in turn driving others of the first plurality of accessories.

In another embodiment according to the previous embodiment, the low speed input shaft and the high speed input shaft are concentric.

In another embodiment according to any of the previous embodiments, the high speed input shaft is hollow and the low speed input shaft is positioned within the high speed input shaft.

In another embodiment according to any of the previous embodiments, each of the low speed and high speed input shafts drives a bevel gear and, in turn, the bevel gears drive gears to drive the first plurality of accessories and the second plurality of accessories, respectively.

In another embodiment according to any of the previous embodiments, each of the bevel gears drive a gear, which is engaged to drive another gear, and the another gear engaged to drive a third gear.

In another embodiment according to any of the previous embodiments, the low speed and high speed input shafts extend from input gears connected to the lower speed spool and the higher speed spool. The lower speed spool includes a low speed compressor driven by a low speed turbine and the higher speed spool includes a high speed compressor driven by a high speed turbine. The input gears from the high and low speed spool drive the low speed and the high speed input shafts along concentric axes.

In another embodiment according to any of the previous embodiments, the low speed input shaft and the high speed input shaft each being driven by tower shafts for rotation about a tower shaft drive axis. The tower shaft drive axis is non-parallel to the low speed and high speed input shafts. The tower shafts drive the low speed input shaft and the high speed input shaft through an angle drive having bevel gears.

In another embodiment according to any of the previous embodiments, each of the low speed and high speed input shafts drive a bevel gear and, in turn, the bevel gears drive gears to drive the first plurality of accessories and the second plurality of accessories, respectively.

In another embodiment according to any of the previous embodiments, each of the bevel gears drive a gear, which is engaged to drive another gear, and the another gear engaged to drive a third gear.

In another embodiment according to any of the previous embodiments, each of the bevel gears drive a gear, which is engaged to drive another gear, and the another gear engaged to drive a third gear.

In another embodiment according to any of the previous embodiments, the low speed and high speed input shafts extend from input gears connected to the lower speed spool and the higher speed spool. The lower speed spool includes a low speed compressor driven by a low speed turbine and the higher speed spool includes a high speed compressor driven by a high speed turbine. The input gears from the high and low speed spool drive the low speed and the high speed input shafts along concentric axes.

In another embodiment according to any of the previous embodiments, the low speed input shaft and the high speed input shaft each being driven by tower shafts for rotation about a tower shaft drive axis. The tower shaft drive axis is non-parallel to the low speed and high speed input shafts. The tower shafts drive the low speed input shaft and the high speed input shaft through an angle drive having bevel gears.

In another embodiment according to any of the previous embodiments, the engine is a two spool engine with the lower speed spool also driving a low speed compressor and a fan.

In another featured embodiment, an auxiliary gearbox for a gas turbine engine includes a low speed input shaft and a high speed input shaft. The low speed input shaft is connected to drive a first plurality of accessories, and the high speed input shaft is connected to drive a second plurality of accessories. The first plurality of accessories rotate about a first set of rotational axes, which are parallel to each other but spaced along an axial input direction and are perpendicular to a first plane and the second plurality of accessories rotating about a second set of rotational axes, which are parallel to each other and spaced along an axial input direction and perpendicular to a second plane. The first and second planes extend in opposed directions away from a drive input axis of the high speed input shaft and the low speed input shaft. The low speed input shaft drives a transmission gear. The transmission gear is an input to a variable speed transmission. The variable speed transmission varies an input speed to a desired output speed, and the variable speed transmission in turn drives others of the first plurality of accessories.

In another embodiment according to the previous embodiment, the low speed input shaft and the high speed input shaft are concentric.

In another embodiment according to any of the previous embodiments, the high speed input shaft is hollow and the low speed input shaft is positioned within the high speed input shaft.

In another embodiment according to any of the previous embodiments, each of the low speed and high speed input shafts drives a bevel gear and, in turn, the bevel gears drive gears to drive the first plurality of accessories and the second plurality of accessories, respectively.

In another embodiment according to any of the previous embodiments, each of the bevel gears drive a gear, which is engaged to drive another gear, and the another gear engaged to drive a third gear.

In another embodiment according to any of the previous embodiments, the low speed and high speed input shafts extend from input gears to be connected to a lower speed spool and a higher speed spool. The lower speed spool includes a low speed compressor driven by a low speed turbine and the higher speed spool includes a high speed compressor driven by a high speed turbine. The input gears drive the low speed and the high speed input shafts along concentric axes.

In another embodiment according to any of the previous embodiments, the input gears are part of an angle drive having bevel gears.

These and other features may be best understood from the following drawings and specification.

DETAILED DESCRIPTION

Figure 1:
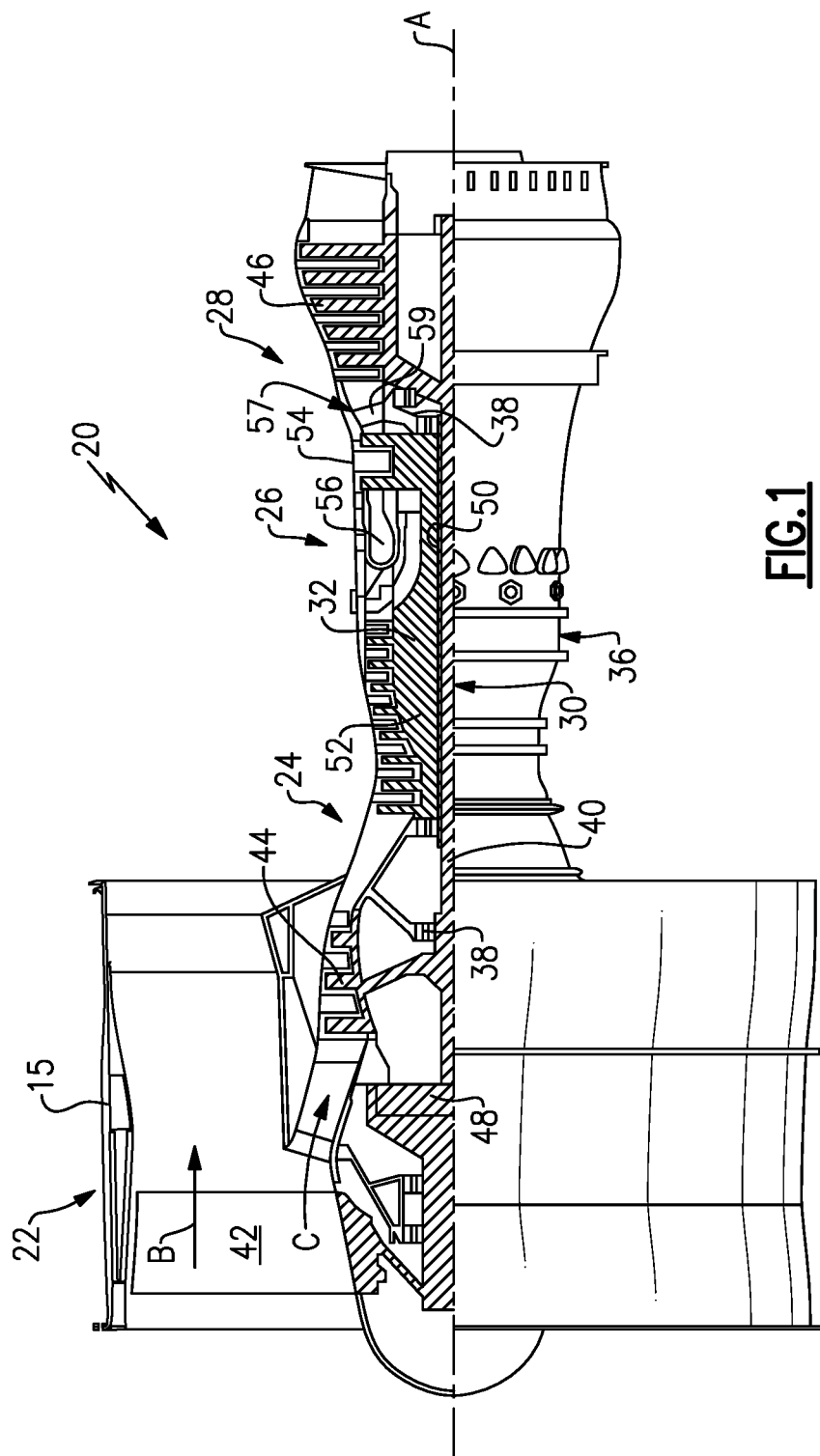
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

Figure 2:
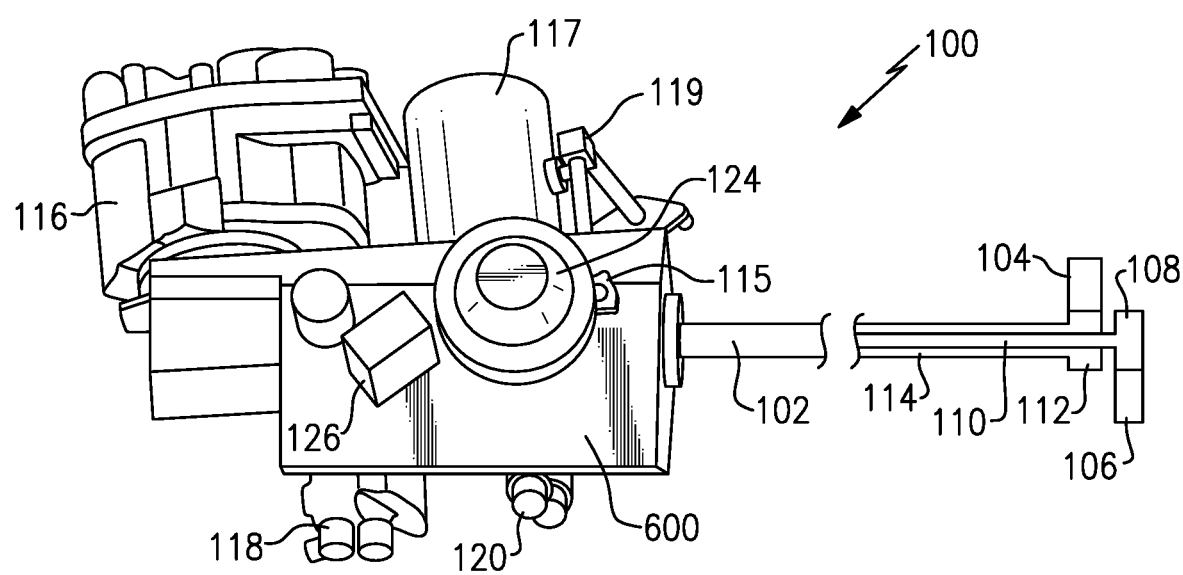
FIG. 2 shows an accessory gearbox.

An accessory gearbox 100 and drive system is illustrated in FIG. 2. An input shaft 102 includes concentric inputs from both a low spool and a high spool, such as those in the engine of FIG. 1. Thus, a gear 104 may drive a gear 112 associated with a high speed input shaft 114. The shaft 114 is known as a lay shaft. A gear 106, associated with the low speed spool, may drive a gear 108 associated with an input shaft 110. Again, input shaft 110 may be what is known as a lay shaft. In the FIG. 2 embodiment, one can see the shafts 110 and 114 are concentric, with the shaft 110 positioned inside the hollow shaft 114. Further, the input 102 into the gearbox 115 is the tower shafts 110/114.

As will be explained below, the accessories may include a generator 116, a variable transmission 117, an air turbine starter 124, a de-oiler 115, an oil pump 120, a hydraulic pump 118, and a fuel pump 126. In one embodiment, generator 116, transmission 117, a rotator tool 119, the oil pump 120, and the hydraulic pump 118 may all be driven by the low speed tower shaft 110. The de-oiler 115, air turbine starter 124, fuel pump 126 may be driven by the high speed tower shaft 114.

Figure 3A:
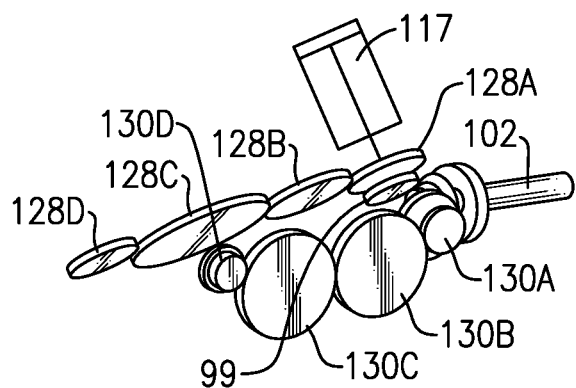
FIG. 3A shows drive details.

FIG. 3A shows the input 102. Gears 130A, 130B, 130C, and 130D are driven together by shaft 114. These gears all, in turn, drive the accessory such as shown in FIG. 2A.

The input lay shaft 110 drives a plurality of gears 128A, 128B, 128C, and 128D. These gears then drive the several low speed driven auxiliary systems. As known, the input from the low speed spool can vary in speed dramatically. A number of the accessories need a significantly narrower speed range than what the typical low spool of a two spool engine typically delivers. Shaft 110 drive an input gear 99, and into variable speed transmission 117, which provides a narrower speed range to output 128A. Thus, the variable speed transmission 117 drives the first gear 128A, and gear 128A engages gears 128B/C/D such that the variable speed transmission 117 can take in a varying input from the input shaft and give a more constant output to the downstream gears 128B/C/D.

The variable speed transmission 117 could be any number of transmission types. As an example, multi-speed transmissions, continuously variable transmissions, etc.

Figure 3B:
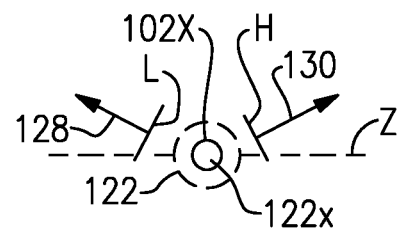
FIG. 3B schematically shows geometric relationships.

As can be appreciated from FIG. 3B, the gearbox could be said to be a V gearbox. The V gearbox is defined by two planes L and H. Gearbox plane L includes a plurality of rotational axes 128 of the gears 128A-128D. Plane H is the same, but with the rotational axes 130 of the gears 130A-130D. The axes 128A-128D extend perpendicularly through the plane L and are parallel to each other. The same is true for the axes 130A-130D in claim H. The planes L, H can be seen to define angles relative to a plane Z, which bisects the rotational axis 102X of the shafts 110 and 114. As can be appreciated, the angles defined by the planes L, H extend in opposed directions relative to the axis 102X.

A single gearbox 600 (see FIG. 2) is able to package all of the accessories and gear, in large part due to the V arrangement.

Figure 3C:
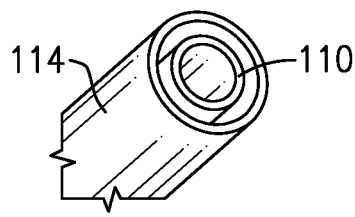
FIG. 3C shows a detail of an input.

FIG. 3C shows the tower shaft 110 packaged within the tower shaft 114.

Figure 3D:
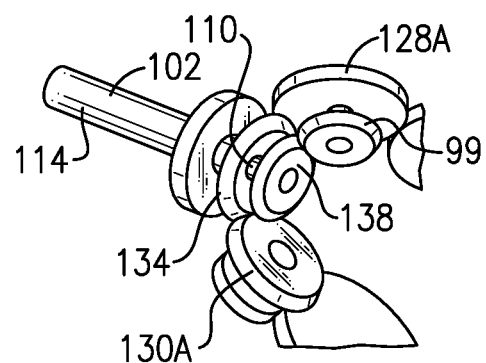
FIG. 3D shows further details of the input.

FIG. 3D shows a gear 138, which is driven by the shaft 110 to, in turn, engage and drive the gear 99, and then the other gears 128A-D as shown in FIG. 3A. Similarly, a bevel gear 134 driven by shaft 114 drives gear 130A and, in turn, the other gears 130B-D.

Figure 4:
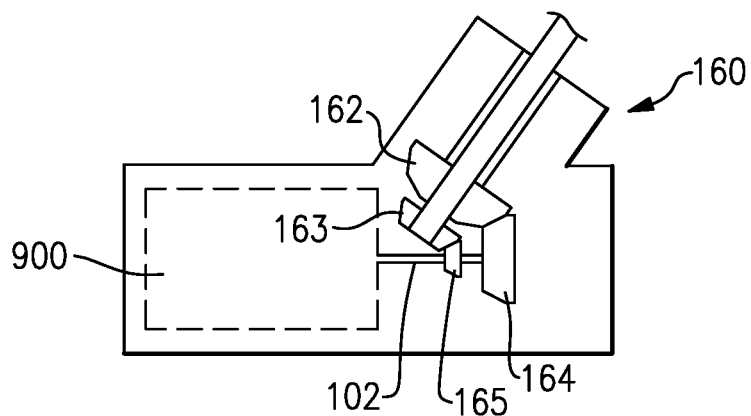
FIG. 4 shows another alternative.

FIG. 4 shows an alternative embodiment where rather than the tower shafts extending parallel into the gearbox, the tower shafts may drive an angle drive 160 having a bevel gear 162 and a bevel gear 163 driving gears 164 and 165, respectively, to provide the input 102. Input shafts 110/114, and an arrangement similar to that shown in FIG. 3D would be downstream of the input 102. Then, this would drive the accessory gearbox 900, similar to the FIG. 2 embodiment.

A gas turbine engine under this disclosure has a low speed input shaft from a lower speed spool and a high speed input shaft from a higher speed spool. The low speed input shaft is connected to drive a first plurality of accessories, and the high speed input shaft is connected to drive a second plurality of accessories. The first plurality of accessories rotate about a first set of rotational axes, which are parallel to each other but spaced along an axial input direction and are perpendicular to a first plane. The second plurality of accessories rotate about a second set of rotational axes, which are parallel to each other and spaced along an axial input direction and perpendicular to a second plane. The first and second planes extend in opposed directions away from a drive input axis of the high speed input shaft and the low speed input shaft. The low speed input shaft drives a transmission gear. The transmission gear is an input to a variable speed transmission. The variable speed transmission varies an input speed to a desired output speed, and the variable speed transmission in turn drives others of the first plurality of accessories.

In general, this disclosure is particularly useful when the low speed input shaft is part of a two spool engine. The two spool engine in particular driving a fan through a gear reduction, and having a wide speed excursion (as an example 80%).

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gas turbine engine comprising:
a low speed input shaft from a lower speed spool and a high speed input shaft from a higher speed spool, said low speed input shaft connected to drive a first plurality of accessories, and said high speed input shaft connected to drive a second plurality of accessories, said first plurality of accessories rotating about a first set of rotational axes, which are parallel to each other but spaced along an axial input direction and are perpendicular to a first plane and said second plurality of accessories rotating about a second set of rotational axes, which are parallel to each other and spaced along an axial input direction and perpendicular to a second plane;
said first and second planes extending in opposed directions away from a drive input axis of said high speed input shaft and said low speed input shaft, said first plurality of accessories and said second plurality of accessories together forming a v-shaped gearbox arrangement, with said first and second planes extending away from each other to provide the v-shape; and said low speed input shaft driving a transmission gear, said transmission gear being an input to a variable speed transmission, and said variable speed transmission varying an input speed to a desired output speed, and said variable speed transmission in turn driving at least some of said first plurality of accessories.

2. The gas turbine engine as set forth in claim 1, wherein said low speed input shaft and said high speed input shaft are concentric.

3. The gas turbine engine as set forth in claim 2, wherein said high speed input shaft is hollow and said low speed input shaft is positioned within said high speed input shaft.

4. The gas turbine engine as set forth in claim 3, wherein each of said low speed and high speed input shafts drives a bevel gear and, in turn, said bevel gears drive first gears to drive said first plurality of accessories and said second plurality of accessories, respectively.

5. The gas turbine engine as set forth in claim 4, wherein each of said bevel gears drive one of said first gears, which is engaged to drive another gear, and said another gear engaged to drive a third gear.

6. The gas turbine engine as set forth in claim 5, wherein said low speed and high speed input shafts extend from input gears connected to the lower speed spool and the higher speed spool, with said lower speed spool including a low speed compressor driven by a low speed turbine and said higher speed spool includes a high speed compressor driven by a high speed turbine, and said input gears from said high and low speed spool driving said low speed and said high speed input shafts along concentric axes.

7. The gas turbine engine as set forth in claim 6, wherein said low speed input shaft and said high speed input shaft each being driven by tower shafts for rotation about a tower shaft drive axis, and said tower shaft drive axis being non-parallel to said low speed and high speed input shafts, and said tower shafts driving said low speed input shaft and said high speed input shaft through input bevel gears.

8. The gas turbine engine as set forth in claim 1, wherein each of said low speed and high speed input shafts drive a bevel gear and, in turn, said bevel gears drive first gears to drive said first plurality of accessories and said second plurality of accessories, respectively.

9. The gas turbine engine as set forth in claim 8, wherein each of said bevel gears drive one of said first gears, which is engaged to drive another gear, and said another gear engaged to drive a third gear.

10. The gas turbine engine as set forth in claim 1, wherein said low speed and high speed input shafts extend from input gears connected to the lower speed spool and the higher speed spool, with said lower speed spool including a low speed compressor driven by a low speed turbine and said higher speed spool includes a high speed compressor driven by a high speed turbine, and said input gears from said high and low speed spool driving said low speed and said high speed input shafts along concentric axes.

11. The gas turbine engine as set forth in claim 1, wherein the engine is a two spool engine with the lower speed spool also driving a low speed compressor and a fan.

12. An auxiliary gearbox for a gas turbine engine comprising:
a low speed input shaft and a high speed input shaft, said low speed input shaft connected to drive a first plurality of accessories, and said high speed input shaft connected to drive a second plurality of accessories, said first plurality of accessories rotating about a first set of rotational axes, which are parallel to each other but spaced along an axial input direction and are perpendicular to a first plane and said second plurality of accessories rotating about a second set of rotational axes, which are parallel to each other and spaced along an axial input direction and perpendicular to a second plane;
said first and second planes extending in opposed directions away from a drive input axis of said high speed input shaft and said low speed input shaft, said first plurality of accessories and said second plurality of accessories together forming a v-shaped gearbox arrangement, with said first and second planes extending away from each other to provide the v-shape; and
said low speed input shaft driving a transmission gear, said transmission gear being an input to a variable speed transmission, and said variable speed transmission varying an input speed to a desired output speed, and said variable speed transmission in turn driving at least some of said first plurality of accessories.

13. The gearbox as set forth in claim 12, wherein said low speed input shaft and said high speed input shaft are concentric.

14. The gearbox as set forth in claim 13, wherein said high speed input shaft is hollow and said low speed input shaft is positioned within said high speed input shaft.

15. The gearbox as set forth in claim 14, wherein each of said low speed and high speed input shafts drives a bevel gear and, in turn, said bevel gears drive gears to drive said first plurality of accessories and said second plurality of accessories, respectively.

16. The gearbox as set forth in claim 15, wherein each of said bevel gears drive a gear, which is engaged to drive another gear, and said another gear engaged to drive a third gear.

17. The gearbox as set forth in claim 16, wherein said low speed and high speed input shafts extend from input gears to be connected to a lower speed spool and a higher speed spool, with the lower speed spool including a low speed compressor driven by a low speed turbine and the higher speed spool includes a high speed compressor driven by a high speed turbine, and said input gears driving said low speed and said high speed input shafts along concentric axes.

18. The gearbox as set forth in claim 17, wherein said input gears are part of an angle drive having bevel gears.

* * * * *